United States Patent [19]

Kaaber

[11] Patent Number: 5,888,258
[45] Date of Patent: Mar. 30, 1999

[54] GRINDING AID MATERIAL, METHOD OF PRODUCING IT, USE OF IT, AND ABRASIVE MATERIAL CONTAINING IT

[75] Inventor: Henning Kaaber, Farum, Denmark

[73] Assignee: Wolff & Kaaber A/S, Denmark

[21] Appl. No.: 793,330

[22] PCT Filed: Sep. 15, 1995

[86] PCT No.: PCT/DK95/00371

§ 371 Date: Apr. 18, 1997

§ 102(e) Date: Apr. 18, 1997

[87] PCT Pub. No.: WO96/08542

PCT Pub. Date: Mar. 21, 1996

[30] Foreign Application Priority Data

Sep. 15, 1994 [DK] Denmark .................................. 1060/94

[51] Int. Cl.⁶ ....................................................... B24D 3/34
[52] U.S. Cl. ................................................. 51/307; 51/309
[58] Field of Search ........................................ 51/307, 309

[56] References Cited

U.S. PATENT DOCUMENTS 4,311,489  1/1982  Kressner ..................... 51/298
5,078,753  1/1992  Broberg et al. ............... 51/298

FOREIGN PATENT DOCUMENTS 0008868  3/1980  European Pat. Off. .
0468092  1/1992  European Pat. Off. .
9402562  2/1994  WIPO .

Primary Examiner—Deborah Jones
Attorney, Agent, or Firm—Ostrolenk, Faber, Gerb, & Soffen, LLP

[57] ABSTRACT

A grinding aid for use in an abrasive material comprising abrasive grains and a grinding aid consists of particles obtainable by crushing a cold bath from the manufacture of metallic aluminium by reducing $Al_2O_3$. This grinding aid is produced by a method wherein the cold bath is crushed, optionally in several steps, whereby particles of an optional free metallic aluminium residue are rolled to flakes, following which the crushed material is screened to optionally sort out the formed aluminium flakes, and then the residual material is recovered as a product or is optionally subjected to further grinding and optionally screening to provide a material which preferably has a grain size distribution corresponding to 100% by weight less than 100 micrometers. This grinding aid lends itself for use in the product of abrasive materials.

23 Claims, No Drawings

GRINDING AID MATERIAL, METHOD OF PRODUCING IT, USE OF IT, AND ABRASIVE MATERIAL CONTAINING IT

BACKGROUND OF THE INVENTION

The present invention concerns a grinding aid consisting of fluoride-containing inorganic compounds for use in an abrasive material comprising abrasive grains and a grinding aid, a method of producing it, use of it as well as an abrasive material containing it.

It is known to use cryolite as a grinding aid in the abrasive composition in abrasive materials, such as sandpaper, emery cloth and grinding wheels, cf. e.g. KIRKOTHMER: ENCYCLOPEDIA OF CHEMICAL TECHNOLOGY, Third Edition, Vol. 10, 1980, line 672, and the mention of the prior art in WO 94/02562.

WO 94/02562 concerns abrasive grains having an outer surface to which a grinding aid material is bonded via interparticle attraction. A large number of materials, inter alia cryolite, including synthetic cryolite, are mentioned as a grinding aid material.

U.S. Pat. No. 5,078,753 concerns an abrasive material having on the abrading face, in addition to abrasive grains, erodable aggregates consisting of a finely ground filler and a resinous binder. The filler may be calcium carbonate, talc, glass, sodium sulfate, cryolite, fluoroborates, etc. Example V uses inter alia sodium cryolite.

EP Patent Application No. 8 868 describes abrasive materials consisting of brittle agglomerates of abrasive grains bonded in an inorganic matrix. The matrix may be based on natural cryolite, e.g. type S from KRYOLITSELSKABET ØRESUND A/S Danmark. These abrasive materials may be produced by melting natural cryolite, adding the abrasive grains, cooling and crushing the cooled material.

Grinding aids are used, because they have a positive influence on the utility properties of the abrasive materials, inter alia grinding rate and product life. No specific knowledge is available about the mechanism of the product improvement obtained. However, it is assumed that the effect of using cryolite as a grinding aid may be due to the circumstance that the chipping created by grinding locally takes place at very high temperatures, and that the cryolite acts as a flux in a melt produced by the chipping, whereby the viscosity of the melt is reduced. However, the effect of the cryolite may also be due to the circumstance that any tendency to block the gaps between the abrasive grains is diminished.

For many years KRYOLITSELSKABET ØRESUND A/S Danmark has supplied a ground natural cryolite for this purpose; thus, the company has supplied natural cryolite ground to −325 mesh, i.e. less than 45 micrometers, to the grinding disc industry.

After the termination of the mining of cryolite in Greenland, natural cryolite is today no longer available in the market. A few producers (from Russia) sell grades which they call natural cryolite, but tests have shown that it is precipitated cryolite types. There are deposits of natural cryolite in Russia, but, as far as is known, they are not suitable for working by flotation. Possibly, the Russian "natural cryolite" is made by extraction of such a deposit with subsequent precipitation.

Thus, in the mid-1990s the cryolite types available in the market are generally synthetic, i.e. produced by a wet precipitation process, and it has been found that none of these commercially available cryolite types are suitable as a grinding aid in abrasive compositions.

The difficulties involved by the use of synthetic cryolite appear to be of two types:

Firstly, there is an aesthetic problem, since the use of synthetic cryolite as a grinding aid results in undesirable stripes in the coating on sandpaper, especially on the finer types. Further, it has been observed that the synthetic cryolite absorbs more binder than the natural cryolite on both fine and coarse sandpaper types.

Secondly, there are productionally unacceptable variations in the course of a production of e.g. sandpaper, there being thus an increasing particle separation and particle agglomeration tendency during the course of the production.

Finally, it has been reported that users of the abrasive materials have experienced unspecified performance problems.

Through detailed studies, the applicants have been able to demonstrate both chemical and morphological differences between natural cryolite and synthetic cryolite, i.e. cryolite produced by a wet precipitation process. The chemical differences have the result that melting point and melt composition will be different for the two types. This may be of importance e.g. to the function as a flux during the grinding process.

The chemical composition of various cryolite types is approximately as follows:

|  | F (%) | Al (%) | Na (%) |
|---|---|---|---|
| Materials from Kryolitselskabet Øresund: | | | |
| Natural cryolite E | 54.3 | 12.9 | 32.9 |
| Natural cryolite S | 54.0 | 12.3 | 31.5 |
| Russian materials: | | | |
| Synthetic neutral | 53.5–54.5 | 14–15 | 28–29 |
| Synthetic acid | 55.5 | 16.7 | 24.8 |
| Hungarian material: | | | |
| Synthetic | 53.2 | 13.3 | | where "%" means % by weight.

Pure, neutral cryolite has the composition 3 NaF.1 AlF$_3$, i.e. an NaF/AlF$_3$ molar ratio of 3.

A cryolite having an excess of AlF$_3$, i.e. having an NaF/AlF$_3$ molar ratio below 3, is called acid cryolite, while a cryolite having an excess of NaF, i.e. having an NaF/AlF$_3$ molar ratio above 3, is called a basic cryolite. The natural cryolite is neutral, while all the synthetic cryolites are more or less acid. The so-called "natural cryolite" from Russia has the same composition as synthetic cryolite and a particle shape and size which can just have been obtained by precipitation from an aqueous solution.

Microscopic studies of various cryolite types show considerable morphological differences. Generally, all the studied synthetic cryolites consist of extremely fine crystals of a quite regular size, typical particle size: 1–2 micrometers, which have agglomerated to particles of a size less than about 25 micrometers, while the natural cryolites are very coarse-grained individual crystals or crystal fragments of widely different particle sizes and with irregularly shaped particles. In other respects, inter alia flowability and dusting and lumping ability, there are just minor differences between the various cryolite types.

Thus, it will be seen that the cryolite types suitable as grinding aids are chemically characterized by being neutral, while the unsuitable grades have been more or less acid.

The problem underlying the invention is to provide a grinding aid which is suitable as substitute for the finely ground, naturally occurring, neutral cryolite used previously, and which does not exhibit the above-mentioned drawbacks associated with the use of synthetic cryolite, a method of producing it, use of it for producing abrasive materials, and abrasive materials containing it.

SUMMARY OF THE INVENTION

It has now surprisingly been found that this problem is solved by a grinding aid consisting of fluoride-containing inorganic compounds for use in an abrasive material comprising abrasive grains and a grinding aid, characterized in that it consists of particles obtainable by crushing a cold bath from the manufacture of metallic aluminum by reducing $Al_2O_3$.

As will be known, metallic aluminum is manufactured on a large industrial scale by reduction in electrolysis cells of $Al_2O_3$, which has been dissolved in a melt produced by fusing cryolite together with minor amounts of calcium fluoride and other fluorides. Additional aluminum fluoride is added to adjust the chemical composition of the melt bath, and 5–10% by weight of aluminum oxide, which is the starting material proper in the aluminum manufacture, is continuously dissolved in the melt.

Such electrolysis baths occur as waste in the closedown of the electrolysis cells, e.g. because of repairs or because of the build-up of impurities in the bath after an extended period of use. The solidified electrolysis bath mass is usually called "cold bath", and it constitutes a recycling problem because the mass balance of the aluminum works means that the bath amount increases in the course of time.

The cold bath contains an acid mixture of various aluminum fluorides, other metal fluorides, minor amounts of metallic aluminum, optionally coal from the lining of the electrolysis cell and ceramic insulation material. An important feature of the cold bath is that it contains considerable amounts of chiolite, which has the formula 5 NaF.3 $AlF_3$, i.e. a compound having an $NaF/AlF_3$ molar ratio of 5/3, together with cryolite. For example, the cold bath may typically contain 40–44% by weight of cryolite and 40–44% by weight of chiolite.

It has surprisingly been found that cold bath material after suitable preparation is useful as a substitute for natural cryolite, even though this cold bath material has an $NaF/AlF_3$ ratio corresponding to an extremely acid cryolite.

Possible abrasive grains are particles of all the materials previously used for this purpose, in particular particles of materials having a Mohs hardness of at least 8, preferably at least 9, e.g. selected from the group consisting of sintered, alpha alumina-based ceramic particles, fused alumina particles, fused alumina-zirconia particles, diamond particles, boron nitride particles, silicon nitride particles, boron carbide particles and garnet particles as well as combinations of these.

According to a preferred embodiment, essentially all the metallic aluminum present in the cold bath is removed. The content of metallic aluminum in the grinding aid is preferably less than 0.5% by weight, in particular less than 0.1% by weight.

According to another preferred embodiment, the present grinding aid contains cryolite and chiolite in a total amount of at least 75% by weight, preferably at least 80% by weight.

Preferably, the grinding aid contains chiolite in an amount of 20–60% by weight, and it preferably has an $NaF/AlF_3$ molar ratio of between 2.5 and 1.875.

According to another preferred embodiment, an optional content of metallic aluminum in the grinding aid is present as particles having a particle size distribution corresponding to 100% by weight less than 50 micrometers and 50% by weight less than 20 micrometers.

The particles in the grinding aid of the invention preferably have a grain size distribution corresponding to 100% by weight less than 100 micrometers, preferably 100% by weight less than 75 micrometers, in particular 100% by weight less than 50 micrometers, especially corresponding to 100% by weight less than 50 micrometers and 50% by weight less than 20 micrometers.

The grinding aid of the invention is preferably produced by a method comprising the following steps:

an electrolysis cell used in the manufacture of metallic aluminum by reducing $Al_2O_3$ in a bath of fused sodium aluminum fluoride is cooled and broken to pieces which are suitable for preliminary sorting, following which the available free aluminum and graphite are sorted out, and then the residual material, i.e. the cold bath, is subjected to crushing, optionally in several steps, whereby particles of an optional free metallic aluminum residue are rolled to flakes, following which the crushed material is screened to optionally sort out the formed aluminum flakes, and then the residual material is recovered as a product or is optionally subjected to further grinding and optionally screening to provide a material having a grain size distribution corresponding to 100% by weight less than 50 micrometers and 50% by weight less than 20 micrometers.

The present invention moreover concerns a method of producing such a grinding aid, which is characterized by comprising the following steps:

an electrolysis cell used in the manufacture of metallic aluminum by reducing $Al_2O_3$ in a bath of fused sodium aluminum fluoride is cooled and broken to pieces suitable for preliminary sorting, following which the available free aluminum and graphite are sorted out, and then the residual material, i.e. the cold bath, is subjected to crushing, optionally in several steps, whereby particles of an optional free metallic aluminum residue are rolled to flakes, following which the crushed material is screened to optionally sort out the formed aluminum flakes, and then the residual material is recovered as a product or is optionally subjected to further grinding and optionally screening to provide a material which preferably has a grain size distribution corresponding to 100% by weight less than 100 micrometers.

The present invention also concerns the use of such a grinding aid for producing an abrasive material.

The present invention moreover concerns an abrasive material comprising abrasive grains and a grinding aid consisting of fluoride-containing inorganic compounds, characterized in that the grinding aid consists of particles obtainable by crushing a cold bath from the production of metallic aluminum by reducing $Al_2O_3$.

Preferred embodiments of the abrasive material of the invention correspond to the embodiments which are described above in connection with the description of the preferred grinding aids.

An essential feature of the present method is that it may comprise a process step in which the metallic aluminum is provided in a form which permits all the metallic aluminium to be removed by screening. This may take place by a number of crushing and grinding methods, which are described more fully in the following examples.

After removal of metallic aluminum, the screened material may be subjected to further grinding or be used in the form it has, depending on the particle size which is advantageous for the contemplated application.

For grinding discs and coarse sandpaper, use may preferably be made of a material which has been crushed so that the greater part of the material has a size which is less than 100 micrometers.

For finer sandpaper, the grain size of the material must be less than 75 micrometers.

For the finest grades of sandpaper, it has been found that the grain size must be less than 50 micrometers.

A particularly preferred grain size distribution is: 4–20% by weight less than 5 micrometers; 30–70% by weight less than 15 micrometers; 75–97% by weight less than 30 micrometers.

EXAMPLES

The invention will be illustrated more fully below by a number of examples:

Example 1

A sample of a cold bath from the aluminum works ISAL in Iceland was crushed in a jaw crusher. Hereby, the particles of metallic aluminum present in the cold bath were in the form of flat, rolled flakes which could easily be sorted out by screening.

The residual material was subjected to chemical analysis, which showed: 51.09% by weight of NaOH-soluble F and 15.15% by weight of total Al.

Composition: Cryolite: 44.9% by weight; Chiolite: 46.4% by weight; $CaF_2$: 4.1% by weight; $Al_2O_3$: 2.3% by weight; inactive: 2.3% by weight; Free Al: 0% by weight.

The residual material was then subjected to grinding in a first grinding step in a swing mill of the Siebtechnik make, in which it was ground to a particle size of 100–150 micrometers. After screening, the product was subjected to further grinding in a second grinding step in a ball mill, producing a product of 85% by weight under 45 micrometers and nothing over 100 micrometers, and a specific surface area (determined by BET) of 0.551 $m^2/cm^3$.

18 kg of this product were used for pilot production of a plurality of sandpaper types. The results showed that this material did not exhibit the drawbacks which were characteristic of the synthetic cryolite, but, on the contrary, had the same excellent performance as the natural cryolite used previously.

Example 2

The starting material described in example 1 was treated as described in example 1, but with the second grinding step performed in an AFG 400 Jet Mill, following which the ground material was screened on an Alpine ATP 100 air screen with a flow of material of 500–600 kg/hour.

The resulting product, which exhibited just as good utility properties as the product described in example 1, had a specific surface area (determined by BET) of 0.694 $m^2/cm^3$ and the following grain size distribution: Nothing over 100 micrometers, 50% by weight less than 15 micrometers.

Example 3

The starting material described in example 1 was treated as described in example 1, but with the second grinding step performed in a pilot ball mill of the Alpine make, following which the ground material was screened on an Alpine ATP 100 air screen with a flow of material of 30 kg/hour.

The resulting product, which exhibited almost just as good utility properties as the products described in examples 1 and 2, had a specific surface area (determined by BET) of 0.723 $m^2/cm^3$ and the following grain size distribution: Nothing over 100 micrometers, 50% by weight less than 16 micrometers.

Example 4

A sample of a cold bath from an aluminum works in Bahrain was crushed in a ring mill. Hereby, the metallic aluminum particles present in the cold bath were in the form of flat rolled flakes which could easily be sorted out by screening on a 103 micrometer screen.

The material was subjected to chemical analysis, which showed:

46.32% by weight of NaOH-soluble F and 15.61% by weight of total Al before crushing.

46.76% by weight of NaOH-soluble F and 14.28% by weight of total Al after crushing and screening.

Composition before crushing: Cryolite: 42.1% by weight; Chiolite: 40.7% by weight; $CaF_2$: 6.5% by weight; $Al_2O_3$: 2.9% by weight; inactive: 9.2% by weight; Free Al: 1.5% by weight.

Composition after crushing and screening: Cryolite: 42.5% by weight; Chiolite 41.1% by weight; $CaF_2$: 6.5% by weight; $Al_2O_3$: 2.9% by weight; inactive: 7.0% by weight; Free Al: 0% by weight; $NaF/AlF_3$ molar ratio: 2.22.

This product was used for pilot production of a plurality of sandpaper types. The results showed that this material did not exhibit the drawbacks which are characteristic of the synthetic cryolite, but, on the contrary, had the same excellent performance as the ground natural cryolite used previously.

Example 5

The starting material described in example 1 was treated as described in example 1, but using in the second grinding step a Jet Mill AJ 100 with a flow of material of 48 kg/hour. In the subsequent air screening, the overfraction contained some free metallic aluminum which was sorted out.

The screened product had the following screen curve, expressed in % by volume: 97% less than 35 micrometers; 50% less than 14 micrometers; 10% less than 5 micrometers.

This product showed just as good results in the production of fine-grained sandpaper as the product described in example 1.

I claim:

1. A grinding aid comprising particles of crushed cold bath, said cold bath being the residual solidified content of an electrolysis cell in which $Al_2O_2$ is reduced to metallic aluminum and which comprises an acid mixture of an aluminum fluoride, chiolite and cryolite.

2. A grinding aid according to claim 1, essentially free of metallic aluminum.

3. A grinding aid according to claim 1, containing metallic aluminum in an amount of less than 0.5% by weight.

4. A grinding aid according to claim 1, in which the cryolite and chiolite content is at least 75% by weight.

5. A grinding aid according to claim 1, in which the chiolite content is 20–60% by weight.

6. A grinding aid according to claim 1, having a $NaF/AlF_3$ molar ratio of between 2.5 and 1.875.

7. A grinding aid according to claim 1, containing metallic aluminum as particles having a particle size distribution corresponding to 100 % by weight less than 50 micrometers and 50% by weight less than 20 micrometers.

8. A grinding aid according to claim 1, wherein said particles have a grain size distribution corresponding to 100% by weight less than 100 micrometers.

9. A grinding aid according to claim 8, wherein said particles have a grain size distribution corresponding to 100% by weight less than 50 micrometers and 50% by weight less than 20 micrometers.

10. A grinding aid according to claim 1, produced by a method comprising the following steps:

providing pieces of a cold bath from which free aluminum and graphite were removed, and then subjecting the cold bath to crushing following by recovering a material having a grain size distribution corresponding to 100% by weight less than 100 micrometers.

11. A method of producing a grinding aid according to claim 1, comprising the following steps:

cooling and breaking into pieces a cold bath following which the available free aluminium and graphite are removed from the cold bath subjecting the resulting cold bath to crushing, and then recovering crushed material which has a grain size distribution corresponding to 100% by weight less than 50 micrometers and 50% by weight less than 20 micrometers.

12. An abrasive material comprising abrasive grains and a grinding aid of claim 1.

13. An abrasive material according to claim 12, essentially free of metallic aluminum.

14. An abrasive material according to claims 12, having a content of metallic aluminum in the grinding aid of less than 0.5% by weight.

15. An abrasive material according to claim 12, in which the content of cryolite and chiolite is a total amount of at least 75% by weight.

16. An abrasive material according to claim 12, in which the content of chiolite is an amount of 20–60% by weight.

17. An abrasive material according to claim 12, in which the grinding aid has an $NaF/AlF_3$ molar ratio of between 2.5 and 1.875.

18. An abrasive material according to claim 12, having metallic aluminum in the grinding aid as particles having a particle size distribution corresponding to 100% by weight less than 50 micrometers and 50% by weight less than 20 micrometers.

19. An abrasive material according to claim 12, which the particles of the grinding aid have a grain size distribution corresponding to 100% by weight less than 100 micrometers.

20. An abrasive material according to claim 19, in which the particles of the grinding aid have a grain size distribution corresponding to at least 100% by weight less than 50 micrometers and 50% by weight less than 20 micrometers.

21. An abrasive material comprising abrasive grains and a grinding aid of claim 10.

22. A grinding aid according to claim 8 wherein the particles have a grain size distribution corresponding to 100% by weight less than 75 micrometers.

23. A grinding aid according to claim 8 wherein the particles have a grain size distribution corresponding to 100% by weight less than 50 micrometers.

* * * * *